April 12, 1966  W. G. KEENEY, JR  3,246,180
CONTROL SYSTEM FOR CONTROLLING THE FLOW OF FLUIDS
Filed Feb. 14, 1962
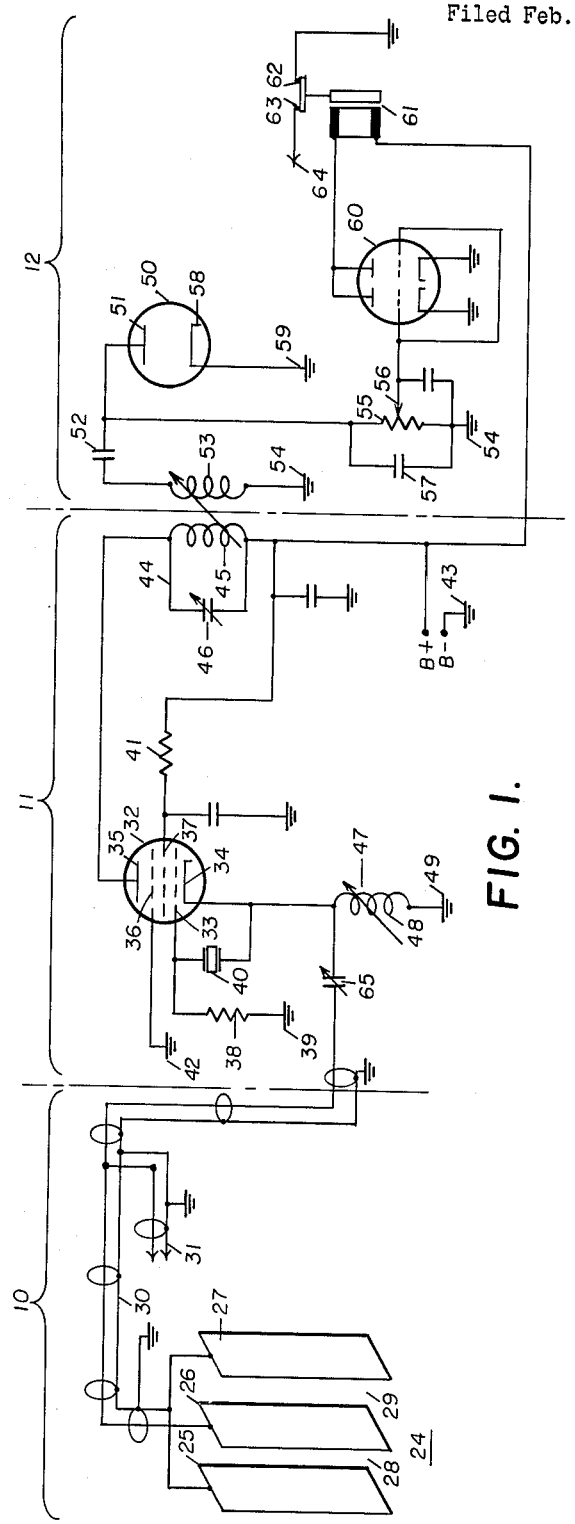
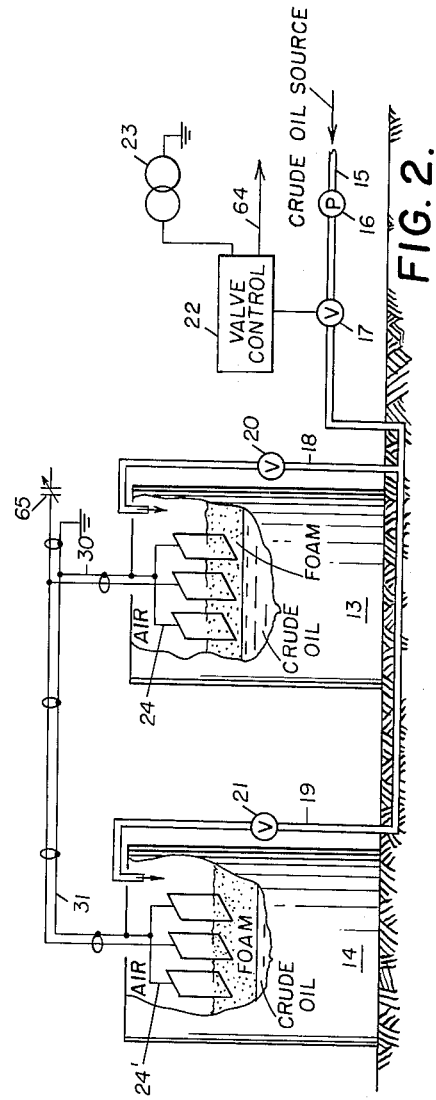
WILLIAM G. KEENEY, JR.
INVENTOR.
BY *Emil J. Bednar*
ATTORNEY

United States Patent Office 3,246,180
Patented Apr. 12, 1966

3,246,180
CONTROL SYSTEM FOR CONTROLLING THE FLOW OF FLUIDS
William G. Keeney, Jr., Paso Robles, Calif., assignor to Socony Mobil Oil Company, Inc., a corporation of New York
Filed Feb. 14, 1962, Ser. No. 173,189
9 Claims. (Cl. 307—118)

This invention relates to an electrical control system used to control the flow of fluids in the filling or emptying of storage tanks. More particularly, this invention relates to such system that is especially useful in controlling the filling of tanks with fluids such as crude oil that may have a layer of foam on their surface.

The use of control systems for controlling the filling and emptying of storage tanks or other vessels which are remotely located from direct human supervision is a necessary aspect in the modern trend of having a producing oil field adapted for complete automation of the production of crude oil therefrom. The flow of crude oil is most desirably completely controlled by various control systems in all steps of its production.

One particularly important step in such production is the filling of storage tanks in the field with the crude oil as it is removed from the wells. Although the control of this step appears to be simple, it is greatly complicated whenever the crude oil is of the type that a layer of foam will form on its surface as it is pumped into the storage tanks. It is this layer of foam on the surface of the crude oil that makes the safe and reliable controlling of the step of filling or emptying of storage tanks impractical by utilization of known control systems.

The control system that can be used to great advantage to control the flow of crude oil having a foam layer on its surface must be capable of being activated only by the desired body of crude oil in the tank and not be falsely activated by the air or foam or other fluid layer superimposed above the body of the crude oil. It is the purpose of this invention to provide such a control system.

It is an object of the present invention to provide a novel electrical control system for controlling the flow of fluids in the filling or emptying of storage tanks remotely located from direct human supervision. Another object is to provide such a system that is reliable, safe and functions with especial facility in controlling the flow of fluids such as crude oil that may have a layer of foam formed on their surface as such fluids are being placed into storage tanks. Another object is to provide such a system that can control the filling of one or more storage tanks without extensive modification. Another object is to provide a control system in accordance with the preceding objects that can be adjusted to operate with a variety of fluids and which can maintain a uniform sensitivity of control regardless of the fluid whose flow the system controls. Other and further objects of the invention will appear as the description proceeds.

In the drawing which is to be read in conjunction with the instant specification and claims, and which constitutes a part thereof:

FIG. 1 shows a schematic diagram of the control system of the present invention with a capacitance-type probe diagrammatically illustrated in perspective; and FIG. 2 shows a plurality of storage tanks with associated fluid transfer members whose functioning is controlled by the novel control system of the present invention.

More particular, in FIG. 2 there is shown a plurality of storage tanks 13 and 14 with associated fluid transfer members arranged in a manner that they control the flow of fluid into such tanks. In particular, such arrangement comprises a conduit 15 extending from a suitable crude oil source and passing through a pump 16 providing for fluid flow. The fluid passes from the pump 16 to a suitable control valve 17 and thence by means of a plurality of conduits 18 and 19 to the storage tanks 13 and 14. The conduits 18 and 19 may be provided with auxiliary valves 20 and 21 respectively for adjusting the rate of fluid flow into each tank so that the tanks fill at the same rate or for other reasons. The control valve 17 is adapted to be closed upon deenergization of an electrically actuated valve control 22. In this manner, the control valve 17 may be operated from a remote location by the control system of which one illustrative example is shown in FIG. 1. One means for operating the valve control 22 is provided by connecting its electrical actuating mechanism in series with a source of alternating current 23 and a switch means supplied by the control system of FIG. 1. The switch means provides for completing a return electrical circuit to the current source.

In each of the tanks 13 and 14 there are positioned capacitance-type probes 24 and 24' respectively at suitable locations where the fluid filling these tanks will immerse these probes upon reaching a desired level or depth therein. This depth or level control is the desired function to be controlled in this storage tank arrangement, i.e., the filling or emptying to a predetermined depth of crude oil or other fluid in these tanks.

Referring now to the drawing, a detailed description of one illustrative embodiment of the control system of the present invention will be given. In FIG. 1, a control system is shown and for purposes of convenient description will be described to include: (1) a capacitance-type probe indicated by brackets 10 that is positioned at a tank in a manner such that as the tank is filled or emptied to a desired level, the desired body of fluid to be monitored is impressed against the probe, (2) an electronic valve having input and output circuits indicated by brackets 11 arranged such that a frequency-stable alternating current signal can be passed at a given amplitude from the former to the latter circuit and having the probe connected to the input circuit for varying the amplitude of the signal in the output circuit in response to impressing of the desired fluid against the probe, and (3) a utilization device indicated by brackets 12 for controlling the functioning of, fluid transfer members associated with the storage tank in response to variation in the amplitude of the signal in the output circuit of said valve.

(1) *The capacitance-type probe*

The capacitance-type probe hereinafter referred to as probe 24 or 24' is of a suitable type in which a change of capacitance occurs upon a change in the dielectric constant of the fluid impressed thereagainst. Probe 24 is comprised of a plurality of rectangular plates 25, 26 and 27 disposed in spaced apart parallel planes and assembled into a rigid unit to provide a capacitance. However, plate 26 is electrically insulated from plates 25 and 27. Probe 24' is identical to probe 24 as far as the present disclosure is concerned and therefore need not be described in detail.

Preferably the probe 24 has a capacitance in air of approximately between 25–1000 mmfd. so that a relatively small change in the dielectric constant of the fluid between its plates will cause large distinct changes in the probe's capacitance. The crude oil flowing into the tanks 13 and 14 upon reaching either the probe 24 or 24' is impressed into spaces 28 and 29 between their plates to provide the dielectric material therebetween. The magnitude of the changes in capacitance is of course determined by the dielectric constant of the fluid, the physical size of the plates and their spacing. Other forms of a capacitance-type probe may be used as will be apparent to one skilled in the art. A coaxial cable 30 may be utilized for interconnecting probe 24 with the remainder of the control system. One or more additional probes 24′ may be connected by coaxial cables, such as cable 31, in parallel with probe 24 if desired so that the filling or emptying of crude oil from a plurality of storage tanks 13 and 14 can be monitored simultaneously. Of course, the first fluid level capable of activating the control system which reaches any probe will cause the necessary change in capacitance of the probe and will result in activating the control system. One important advantage of this arrangement is that a plurality of probes can be connected in parallel to function with a single control system without material alteration thereof. The use with the control system of this invention with one or more probes provides completely safe simultaneous monitoring of the fluid depth in either of the storage tanks 13 or 14 because there is no possibility of an electrical spark causing ignition of the contents of such tanks due to physical damage to the tanks or probes. Further, with the present arrangement, the outer conductor or braid of the coaxial cables interconnecting the probe 24 or 24′ may be grounded to the storage tanks to further reduce any possibility of electrical sparks such as could be caused by lightning or other means.

(2) The electronic valve and associated circuits

The electronic valve and associated input and output circuits indicated by brackets 11 are adapted for passing a frequency stable signal from the former to the latter of said circuits and further, means are incorporated therein for greatly varying the amplitude of the signal in the output circuit responsive to a small change in capacitance of the probe 24 due to a small change in dielectric constant such as occurs when the foam layer on the surface of the crude oil is displaced by the body of crude oil as the fluid immersing probe 24.

The mentioned electron valve in the illustrative embodiment described comprises a pentode electron valve 32 having a grid 33, cathode 34, plate 35, suppressor grid 36, and screen grid 37. Associated input and output circuits are utilized in conjunction with such valve whereby the functions of an oscillator and amplifier or frequency multiplier are obtained from a single valve. Valves such as types 5763, 6AG7 and 6AH6 are usable.

The input circuit includes a grid leak resistance 38 which is connected between grid 33 and a ground at 39. A means for generating a frequency stable alternating current signal is connected between grid 33 and cathode 34 and may take the form of a piezoelectric crystal 40. A crystal 40 with an oscillating frequency of about 7 megacycles is preferred for reasons of stability and signal output capabilities. Other means for generating such signal may be used if desired. Means for varying the biasing of valve 32 to regulate its conductivity and thereby the amplitude of the signal in its output circuit are also included in the input circuit and will be described in greater detail hereafter.

The screen grid 37 of valve 32 is connected to B+, the positive terminal of a suitable D.C. power source such as a battery, through a resistance 41. The screen grid 37 and plate 35 may be provided with by-pass capacitances to avoid extraneous effects. With the described arrangement the screen grid 37 of valve 32 provides the plate of a triode oscillator. This arrangement provides a frequency stable alternating current signal in the input circuitry of valve 32. The suppressor grid 36 may be grounded at 42.

Signal output from the triode portion of valve 32 appears in an output circuit connecting plate 35 and cathode 34. This output circuit includes a resonant means 44 connecting plate 35 and B+. The cathode's ground and the ground at 43 of the negative terminal B— of the aforementioned D.C. power source complete the output circuit. Resonant means 44 comprising of an inductance 45 and variable capacitance 46 in parallel is adapted to be tuned to a frequency selected from the fundamental frequency of the crystal 40 when the input circuit signal is to be amplified in the output circuit and to one of the harmonic frequencies of such fundamental frequency when frequency multiplication in valve 32 is desired. Preferably for reasons more fully developed hereafter, the resonant means 44 is tuned to resonance with the second harmonic of crystal 40. This harmonic frequency is 14 megacycles for a crystal frequency of 7 megacycles.

With this arrangement of the circuitry about valve 32, electron coupling between the input and output circuits is provided which "buffers" the oscillator and makes the frequency of the crystal 40 less susceptible to variations due to loading or tuning, and hence improves the stability of the oscillator to provide a frequency stable alternating current signal and also a signal of uniform amplitude.

The means for selectively varying the biasing of valve 32 are provided by a resonant means 47 connected in series in the input circuit. Resonant means 47 comprises an inductance 48, preferably variable, connecting the cathode 34 and a ground at 49 with the capacitance of probe 24 in shunt thereacross. Probe 24 may be connected either directly or by cable 30 in shunt or parallel to inductance 48. Resonant means 47 provides an impedance through which current flows to bias the valve 32 for selectively regulating its conductivity. However, the combined resistance and impedance of resistance 38 and resonant means 47 is such that valve 32 is always in a conducting state. Thus, there is no problem of signal instability due to oscillation of the crystal 40 being interrupted as valve 32 passes from or to a conducting state.

The self-biasing arrangement described can be considered to provide a negative voltage at grid 33 or a voltage differential between the cathode 34 and ground 49 or B—, or both. In any case, such voltage places bias on valve 32 to regulate its conductivity and provide a signal of uniform frequency and amplitude in the output circuit.

In a preferred aspect of the present invention resonant means 47 is adapted to be tuned in resonance to a frequency about 2 megacycles higher than that of crystal 40 with probe 24 impressed in crude oil. Under such conditions the reactance and resistance of the resonant means 47 provide an impedance for biasing the valve 32. This produces a relative maximum conductivity in valve 32 and the maximum amplitude of the signal in the output circuit because crude oil will have a slightly higher dielectric constant than any other fluid received in the storage tank 13 or 14. Preferably, the resonant means 47 is arranged with its reactance considerably larger than its resistance in order for a small change in frequency from the tuned resonant frequency to produce a large change in impedance due to a change in capacitance of probe 24. That is, resonant means 47 will respond to a greater degree to a signal at the resonant frequency than to frequencies relatively close to resonance. Upon even a slight change in the dielectric constant of the fluid at probe 24, such as occurring when the foam layer or air is impressed on probe 24, the capacitance of probe 24 greatly detunes the resonant means 47 from resonance with its original set resonant frequency. Such detuning results in a large variation in impedance of resonant means 47 and thereby increasing the bias to valve 32. This results in reducing the conductivity of valve 32 and as a result varying the amplitude of the signal in the output circuit. The degree of variation in signal amplitude is very greatly increased when the resonant means 44 in the output circuit of valve 32 is tuned into resonance with the first or higher harmonic of the crystal frequency. This is an advantage arising from this invention in providing a simple but effective means to obtain a desired and great variation in signal amplitude for a given change in the dielectric constant of the fluid between the plates of probe 24.

In an additional aspect the ratio of inductance to capacitance in resonant means 47 is preferably low so that the changes in capacitance of probe 24 will produce large variations in the impedance of said resonant means. This is an important advantage in that the control system is responsive to very small changes in the dielectric constant of fluid impressed on probe 24. Further, the capacitive magnitude of the probe 24 can be adjusted to obtain the desired sensitivity by the size of its plates or their spacing. By this arrangement, the novel control system of the present invention can be readily and positively adjusted to be activated only when the body of crude oil filling tank 13 or 14 is impressed against probe 24 or 24' and not by air, or especially a foam layer. This feature of the present invention makes its use desirable and successful in situations where prior control systems will fail.

If desired, a small variable capacitance 65 may be used in certain installations to assist in resonating the resonant means 47 at the desired frequency and to reduce the reactance effect produced of varying lengths of coaxial cable 30 or 31.

The resonant means 47 may be tuned to frequencies other than the crystal frequency to adjust the excitation of currents through crystal 40 or for other reasons. In such case, inductance 48 is tuned to the desired frequency with the capacitance provided by the probe 24 to provide a given signal amplitude in the output circuit with crude oil impressed against probe 24. When the changes in dielectric constant between the plates of probe 24 occur as fluids other than the crude oil body are impressed against probe 24, the variation in the impedance of the resonant means 47 greatly varies the conductivity of valve 32 to produce proportionate and desired selective changes in the amplitude of the signal in the output circuit.

Suitable means adapted to control the functioning of the fluid transfer members associated with the monitored storage tank in response to such selective variations in signal amplitude are used. These means are herein generally denoted by the term, utilization device. The utilization device preferably is responsive to variations of either increasing or decreasing signal amplitude.

(3) The utilization device

The utilization device indicated by brackets 12 is comprised of rectifier means provided by diode electron valve 50 having a plate 51 connected to the output circuit of valve 32 through a capacitance 52 and an inductance 53 connected in series with a ground at 54. A resistance 55 is connected between plate 51 and ground at 54. The resistance 55 may have a variable tap 56. Resistance 55 may be shunted by capacitance 57. A means to couple the utilization device to the output circuit of valve 32 is provided by the coupling of inductance 53 to inductance 45. The mutual inductive coupling between inductances 45 and 53 may be made variable so that the degree of signal transferring therebetween is readily adjustable. The resonant means 44 is a signal transferring means providing a signal source for the coupling means between the mentioned output circuit and the utilization device.

Diode valve 50 has a cathode 58 grounded at 59. With this arrangement there is produced a rectified unidirectional current through valve 50 proportional in magnitude to the amplitude of that portion of the signal in the output circuit of valve 32 transferred to the rectifier by the coupling means. A negative bias voltage is produced across resistance 55 due to current flow through valve 50.

A duo-triode electron valve 60, such as a type 12AT7, is utilized as part of the utilization device. Valve 60 has its grids, plates and cathodes connected in parallel to increase its current conducting capacities. The cathodes are grounded. The grids are connected at least in part by means of the variable tap 56 across resistance 58 to provide a bias voltage on the grids of valve 60.

A relay circuit is provided connecting B+ and the plates of valve 60. Included in the relay circuit is a relay coil assembly 61 for activating a switch means such as a single pole single throw switch with associated contacts 62 and 63. The contact 62 is grounded and contact 63 leads via conductor 64 to valve control 22. The relay coil assembly 61 has a sufficient sensitivity to be activated upon a change in the conductivity of valve 60 resulting from a change in the bias voltage across resistance 55. The bias voltage change is of course produced by a variation in the amplitude of the signal in the output circuit of valve 32 upon impressing crude oil against probe 24 or 24'.

The utilization device described has many advantages when used in the present invention. As an example, with a given signal amplitude in the output circuit of valve 32, the bias voltage in resistance 55 may be adjusted by varying the coupling between the inductances 45 and 53. Further, the exact magnitude of change in the bias applied to the grids of valve 60 required to cause relay coil assembly 61 to be activated upon a certain variation in the amplitude of such signal is readily set by adjusting tap 56 on resistance 50. These features provide an additional method to achieve the same sensitivity for any magnitude of change in dielectric constant of the fluid between the plates of probe 24 or 24'. Further, the responsive sensitivity to a given magnitude of change in the dielectric constant of such fluid can be made uniform regardless of the actual magnitude of the dielectric constant. These features are of great importance in that the same probe 24 can be used with equal facility and result to monitor the flow of any fluid by sensing and responding only to a certain dielectric constant of that fluid for which the control system is adjusted to control. It also insures that the control system of the present invention adjusted for crude oil monitoring is not falsely activated by other fluids such as air, steam, foam and the like having only slightly different dielectric constants than that of crude oil.

Other forms of utilization devices can be utilized to provide for controlling the fluid transfer members associated with the storage tanks 13 and 14 in response to variations in the amplitude of the signal in the output circuit of valve 32 if all of the advantages of the described means are not desired or possibly for other reasons.

Operation

The novel control system is adjusted and operates in the following manner.

With crude oil filling either of the storage tanks 13 or 14 to a depth sufficient to be impressed against probe 24 or 24' and with the various electron valves in operation, the resonant means 47 in input circuit of valve 32 is tuned into resonance with the desired frequency. This provides a maximum amplitude of the signal in the oscillator portion or input circuit of valve 32. The resonant means 44 in the output circuit of valve 32 is tuned in resonance with the first harmonic frequency of the crystal 40 to obtain the desired maximum amplitude of the signal in such output circuit.

The coupling between inductance 48 and 53 is adjusted to provide a sufficient magnitude of bias voltage on resistance 55 so that tap 66 thereon may be set to provide a bias voltage at the grids of valve 60 sufficient to decrease its conductance to a value where the relay coil assembly 61 is not activated. The electrical circuit to valve control 22 is now incomplete so that control valve 17 is closed and terminates any further flow of crude oil into tanks 13 and 14. The control system is now adjusted to safe reliable operation with crude oil.

When the tank 13 or 14 is empty of crude oil another fluid is impressed against probe 24 or 24' and a large decrease in the amplitude of the signal in the output circuit of valve 32 now occurs. This variation in the signal's amplitude proportionally reduces the bias voltage on resistance 55 and results in valve 60 conducting to activate relay coil assembly 61 to activate valve control 22 and permit flow of crude oil into tanks 13 and 14. The novel control system of this invention will now permit the crude oil flow until the body of crude oil in either tank 13 or 14 reaches a depth sufficient to immerse either probe 24 or 24'. At such time the flow of crude oil will be terminated. This provides for the desired control of the fluid transfer members at the storage tank to terminate the filling of the tank.

The control system of the present invention may of course be operated by changes in the dielectric constant of fluid which either increases or decreases the capacitance of probe 24 or 24' by selecting the proper valve control.

The resonant means 47 may also be tuned in resonance with the same or a frequency different from that of the crystal 40 and the control system can still function in a reliable manner because the utilization device is adaptable to respond to either an increase or decrease in the amplitude of the signal in the output circuit of valve 32.

When the resonant frequency of resonant means 47 is higher than the crystal freqeuncy, an increase in the dielectric constant of the fluid will reduce the amplitude of the signal in the output circuit of valve 32. A decrease in the dielectric constant has a reverse effect. When the resonant frequency of resonant means 47 is lower than the crystal frequency, the reverse effect upon the amplitude of the signal in the output circuit of valve 32 occurs in response to a crude oil immersing probe 24 or 24'. In such operating conditions, where the direction of change of the dielectric constant is known, the utilization device can be used to indicate such change in the following manners.

Operation under conditions where crude oil is impressed against probe 24 or 24' to cause an increase in the amplitude of the signal in the output circuit of valve 32 has been priorly described.

When the crude oil immersing probe 24 or 24' produces a decrease in the amplitude of the signal in the output circuit of valve 32, the tap 56 on resistance 55 is adjusted to produce sufficient bias on the grids of valve 60 to activate the relay coil assembly 61 and to deactivate the relay coil assembly upon an increase in the signal amplitude when a fluid other than crude oil immerses the probe. This provides the desired indication of the change in dielectric constant for controlling the flow of crude oil. The other adjustments to the control system are the same as previously described.

Thus, either mode of operation may be utilized depending upon the operating conditions surrounding the control system.

The control of the emptying of the storage tank is achieved in the same manner as the filling except that the probe is placed at a position near the bottom of the tank and the fluid pump is adapted to terminate removing the monitored fluid from the storage tank upon the monitored fluid being removed from the probe 24 or 24'.

Some of the many advantages arising from the foregoing description of the novel control system of the present invention have been given. Another outstanding advantage arises from circuitry which does not require complex, or difficultly adjusted oscillator circuits which must begin or cease oscillation at a given frequency or to change frequency responsively to changes in the dielectric constant of the monitored fluid. Further, should physical injury to the capacitance-type probe occur, the resulting variation in amplitude of the signal in the output circuit of the detector means would provide an indication of a change in the dielectric constant of the monitored fluid. This provides a fail-safe control system.

From the foregoing, there has been provided a control system well adapted to attain all the objects of the present invention and to provide advantages in addition to those specifically set forth.

It will be understood that while preferred embodiments of the invention have been shown and described, many modifications thereof can be made by one skilled in the art without departing from the intent of this invention. It is intended that such modifications are to be included within the scope of the appended claims.

The invention having been described, what is claimed is:

1. A control system for controlling the flow of fluids in the filling or emptying of a storage tank comprising an electron valve with associated input and output circuits for continuously passing an alternating current signal from the former to the latter of said circuits, a means for generating a frequency stable alternating current signal connected to the input circuit, a resonant means connected in series with the input circuit providing an impedance for biasing said valve to regulate the amplitude of said signal in the output circuit, a capacitance-type probe positioned at the storage tank and operatively connected to the resonant means for producing variations in the impedance of said resonant means in response to fluid impressed against said probe, a utilization device, signal transferring means to couple the utilization device to the output circuit of the electron valve, and said device including means to control the functioning of fluid transfer members associated with the tank containing said probe in response to variations in the amplitude of said signal in the output circuit of said valve.

2. The system of claim 1 wherein the signal transferring means is adapted to be tuned in resonance with the second harmonic frequency of said signal in the input circuit.

3. A control system for controlling the flow of fluids in the filling or emptying of a storage tank comprising an electron valve having a grid, cathode and plate, an input circuit between said grid and cathode and an output circuit between said plate and cathode for continuously passing a frequency stable signal from the former to the latter of said circuits, a means for generating a frequency stable alternating current signal connected to the input circuit, a resonant means connected in series in said input circuit providing an impedance for biasing said valve to regulate the amplitude of said signal in the output circuit, a capacitance-type probe positioned at the storage tank and operatively connected to the resonant means for producing variations in the impedance of said resonant means in response to fluid impressed against said probe, a utilization device, signal transferring means to couple the utilization device to the output circuit of the valve, and said device including means to control the functioning of fluid transfer members associated with the probe monitored tank in response to variations in the amplitude of said signal in the output circuit of said valve.

4. The system of claim 3 wherein the signal transferring means is adapted to be tuned in resonance with the second harmonic frequency of said signal in the input circuit.

5. The system of claim 3 wherein the resonant means is comprised of a tank circuit including inductance and capacitance connecting the grid and cathode of the electron valve and the capacitance-type probe is operatively connected in said tank circuit whereby the capacitance in such tank circuit is varied in response to fluid impressed against said probe.

6. The system of claim 3 wherein the resonant means is adapted to be tuned in resonance with the frequency of said signal in said input circuit.

7. A control system for controlling the flow of fluids in the filling or emptying of a storage tank comprising an electron valve having a grid, cathode and plate, an input circuit between said grid and cathode and an output circuit between said plate and cathode for continuously passing a frequency stable signal from the former to the latter of said circuits, a means for generating a frequency stable alternating current signal connected to the input circuit, a resonant means connected in series in said input circuit providing an impedance for biasing said valve to regulate the amplitude of said signal in the output circuit, a capacitance-type probe positioned at the storage tank and operatively connected to the resonant means for producing variations in the impedance of said resonant means in response to fluid impressed against said probe, a second resonant means in the otuput circuit adapted to be tuned in resonance with a frequency selected from the fundamental and harmonic frequencies of said signal in the input circuit, a utilization device, means connecting said device to the output circuit of said valve, and said device including means to control the functioning of fluid transfer members associated with the probe monitored tank in response to variations in the amplitude of said signal in the output circuit of said valve.

8. The system of claim 7 wherein the second resonant means is tuned in resonance with the second harmonic frequency of said signal in the input circuit.

9. A control system for controlling the flow of fluids in the filling or emptying of a storage tank comprising an electron valve having a grid, cathode and plate, an input circuit between said grid and cathode and an output circuit between said plate and cathode for continuously passing a frequency stable signal from the former to the latter of said circuits, a means for generating a frequency stable alternating current signal connected to the input circuit, a resonant means connected in series in said input circuit providing an impedance for biasing said valve to regulate the amplitude of said signal in the output circuit, a capacitance-type probe positioned at the storage tank and operatively connected to the resonant means for producing variations in the impedance of said resonant means in response to fluid impressed against said probe, a second resonant means in the output circuit adapted to be tuned in resonance with a frequency selected from the fundamental and harmonic frequencies of said signal in the input circuit, a rectifier means connected to the output circuit for providing a rectified current proportional in magnitude to the amplitude of the signal in such output circuit, a second electron valve having input and output circuits, a resistance connected at least in part in said input circuit of the second valve and said resistance connected in shunt with said rectifier means to provide a bias voltage sufficient to decrease the conductivity of the second valve when said signal in the output circuit of the first mentioned valve is at a maximum amplitude, and signal means in said second valve's output circuit activated by an increase in conductivity of said second valve and including a switch means for controlling the functioning of fluid transfer members associated with the probe monitored tank in response to variations in the amplitude of said signal in the output circuit of said valve.

References Cited by the Examiner

UNITED STATES PATENTS

| 2,621,517 | 12/1952 | Sontheimor | 73—304 |
| 2,621,518 | 12/1952 | Sontheimor | 73—304 |
| 2,677,964 | 5/1954 | Engleden | 73—304 |
| 2,742,609 | 4/1956 | Black et al. | 73—304 |
| 2,871,874 | 2/1959 | Coles et al. | 323—69 |

FOREIGN PATENTS

| 586,289 | 11/1959 | Canada. |
| 796,188 | 6/1958 | Great Britain. |

LLOYD McCOLLUM, *Primary Examiner.*

ROBERT C. SIMS, *Examiner.*